United States Patent Office 2,984,971
Patented May 23, 1961

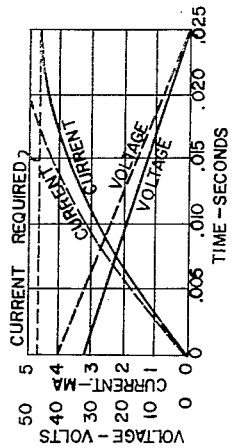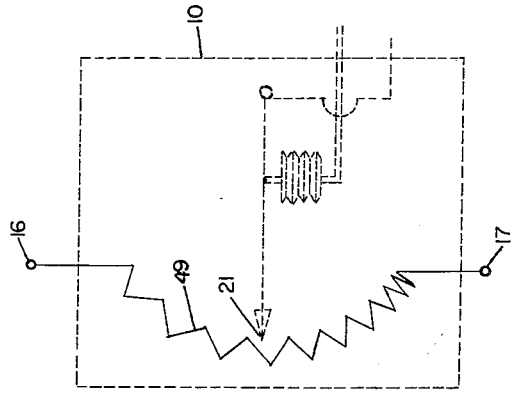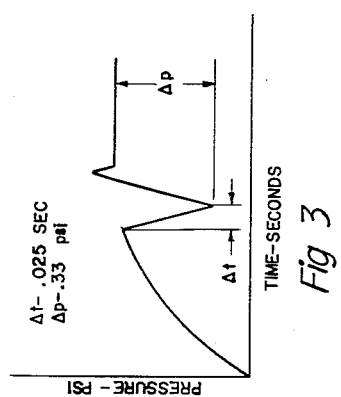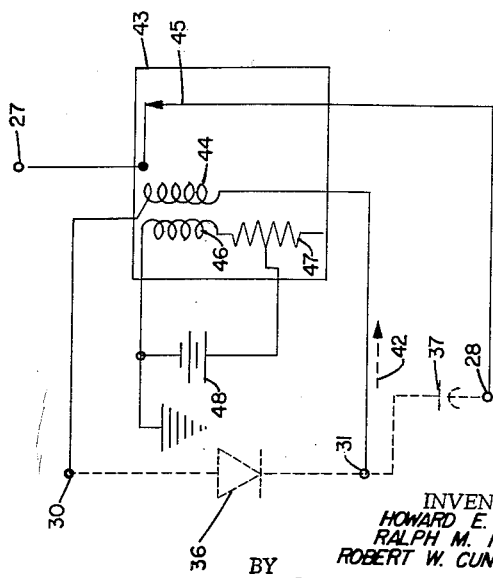

2,984,971
CONTROL SYSTEM

Howard E. Corbitt, Arcadia, Robert W. Cunningham, Monrovia, and Ralph M. Hill, Jr., Azusa, Calif., assignors to Aerojet-General Corporation, Azusa, Calif., a corporation of Ohio Filed Sept. 16, 1957, Ser. No. 684,014

8 Claims. (Cl. 60—35.6)

This invention relates to the monitoring of gas pressure, and more particularly to an electrical monitoring system for this purpose.

An object of this invention is to provide such a monitor system which is actuated by decreases in pressure, but which is not actuated by increases in pressure.

Loss of gas pressure in the thrust chamber pressure of a rocket motor during the period of starting, when gas pressure should be steadily increasing, is indicative of dangerous starting conditions which requires that the fuel supply of the rocket motor be shut off to prevent excess fuel accumulation and likely destruction of the motor by explosion. It is therefore desirable to provide a means for monitoring decreases in gas pressure at various magnitudes of rocket motor thrust chamber pressures, which pressure decreases are relatively small compared to the minimum level of thrust pressure at the particular instant of monitoring. With a device sensitive to pressure decreases, the pressure decreases may actuate a shut off of the rocket motor fuel over relatively short periods of time. This may be accomplished if the shut off of the fuel supply source to the rocket motor is actuated by a fast-acting electrical means controlled by a nearly instantaneously monitoring electrical system which senses the pressure decrease and directly controls the fuel supply.

This invention is carried out by providing an electrical control system comprising a potentiometer type transducer sensitive to reductions of gas pressure which, when there is a predetermined reduction in gas pressure, causes a charged actuating condenser to discharge through a relay coil having related to it, operable contacts used for controlling signal means, a relay or the like.

A feature of the invention resides in a current rectifier provided in the electrical control system through which the charge may be increased on the condenser while there is an increase of gas pressure, without signaling or operating a controlling relay of the system during such periods of gas pressure increases.

The foregoing and other features of the invention will be more fully understood from the accompanying drawing of which:

Fig. 2 is a graph of current and voltage curves plotted against time showing characteristic operation of the electrical control system device of Fig. 1;

Fig. 3 is a graph of increment of pressure decrease plotted against time showing characteristic operation of the electrical control system of Fig. 1;

Fig. 4 shows schematically a variation of a relay element which may be substituted in the system of Fig. 1, part of which is shown in phantom lines; and Fig. 5 shows schematically a variation of a transducer potentiometer resistor which may be substituted in the system of Fig. 1, part of which is shown in phantom lines.

Figure 1:
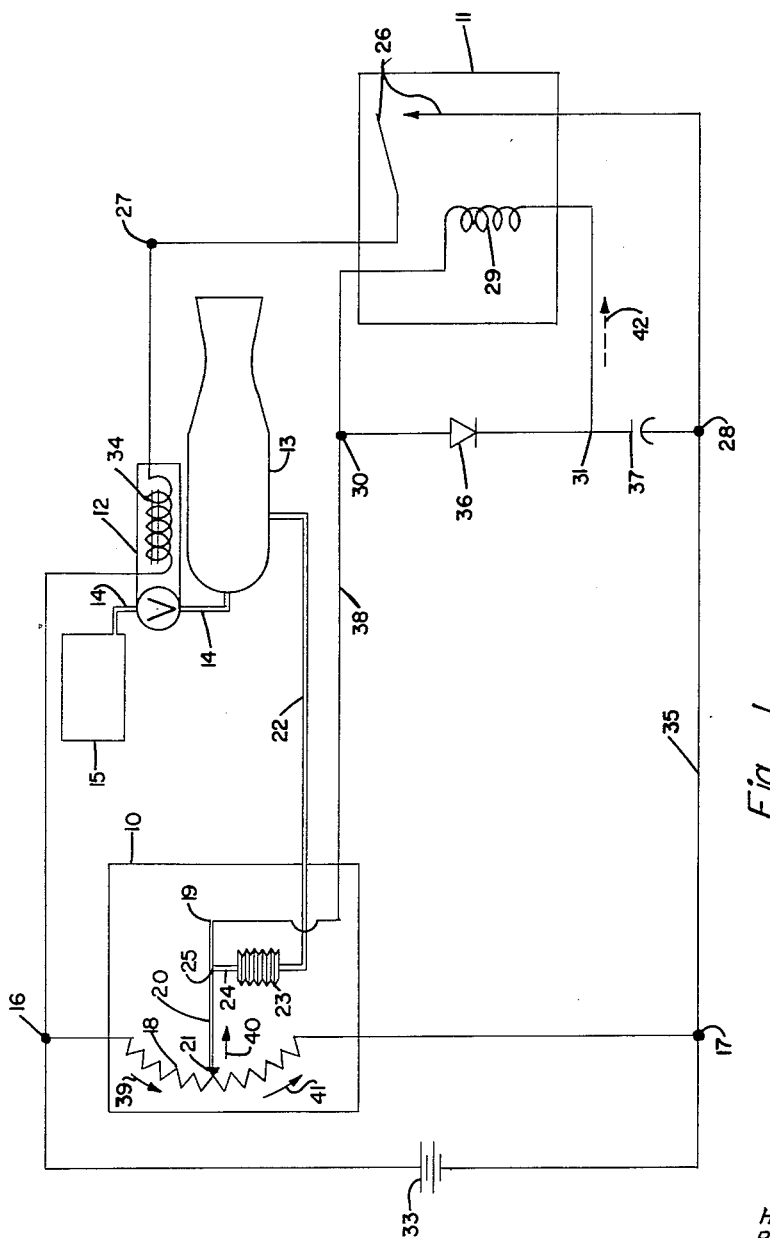
Fig. 1 shows schematically an electric monitoring control system, arranged in working relationship with a rocket motor.

In Fig. 1, there is shown a potentiometer type pressure transducer unit 10, a control relay 11 and a relay controlled solenoid valve 12 arranged in a working relationship with a thrust chamber 13 and a fuel supply conduit 14 in fluid communication with the thrust chamber 13 and a fuel supply tank 15. The transducer unit 10 has two terminals 16 and 17 at opposite ends of a curved potentiometer resistor 18 and an intermediate terminal at a fixed electrical contact 19. A movable conductive lever 20 is pivoted at the contact 19 and has a movable contact 21 in contact with the resistor 18. The transducer unit 10 has a pressure conduit 22 connected into the thrust chamber 13. The end of the pressure conduit 22 within the transducer unit 10 has a closed expansible bellows 23 in fluid communication with the conduit 22 on one end of the bellows and an attached insulated arm 24 on the opposite end of the bellows. The insulated arm 24 is in mechanical contact at 25 with the movable conductive lever 20. Pressure changes in the thrust chamber 13 operate to expand or contract the bellows 23 and move both the insulated arm 24 and the movable conductive lever 20, upwards or downwards respectively.

The control relay 11 has two relay contacts 26, each of which are connected electrically to one of the electrical relay terminals 27 and 28. The two relay contacts 26 are actuated by a relay coil 29 having two electrical relay terminals 30 and 31. A D.C. power supply 33 is provided across the potentiometer resistor 18 with the positive side of the D.C. supply connected to the potentiometer terminal 16 and the negative side of the D.C. supply connected to the potentiometer terminal 17. The relay controlled solenoid valve 12 in the fuel supply conduit 14 has an electrical coil 34 connected in series with the relay contacts 26 between the relay terminal 27 and the positive side of the D.C. supply 33 at the terminal 16. The relay contacts 26 are connected to the negative side of the D.C. supply 33 by a lead, represented by the line 35, extending from the relay terminal 28 to the potentiometer terminal 17, which is attached to the negative side of the D.C. supply.

A rectifier or unilateral current conducting device, represented by a conventional symbol 36, which may be a diode tube type rectifier or a crystal junction rectifier or the like, is provided between the two relay coil terminals 30 and 31. The rectifier 36 and the relay coil 29 are chosen so that the impedance of the coil compared to the forward impedance of the rectifier is relatively high, so that the rectifier will more easily provide a current path for current in the forward direction through the rectifier. The rectifier 36 is connected so as to have a forward direction of current flow from the relay terminal 30 to the relay terminal 31 when supplied with current from the D.C. supply 33 by way of the movable contact 21 and the positive terminal 16. A condenser energy storage device 37 is provided between the relay terminal 31 and the relay terminal 28 which is electrically connected to the negative terminal 17 by the lead 35.

The rectifier 36 is connected electrically at the relay terminal 30, by a lead, represented by the line 38, to the fixed electrical contact 19 of the transducer unit 10.

An arrow 39 from the positive connected terminal 16 represents current flow from the D.C. supply 33 through the upper portion of the resistor 18. The current divides and goes through two branches at the movable electrical contact 21. One current portion, represented by the arrow 40, flows through the lead 38 and the other current portion, represented by the arrow 41, flows through the lower half of the potentiometer resistor 18 to the negative connected terminal 17. During one period of operation of the system shown in Fig. 1, the current 40 does not flow, and during this time a current, represented by the dotted arrow 42 flows through the coil 29 in the direction indicated by this arrow. During this time the rectifier 36 carries only a small leakage current in the reverse direction and the substantial portion of the current 42 in the reverse direction flows through the coil 29 which acts as a shunt around the rectifier 36 which has a very much greater impedance in the reverse direction than has the coil 29.

The system operates as follows:

Steadily increasing pressure in the thrust chamber 13 causes the bellows 23, attached to the conduit 22, to expand and move the pivoted conductive arm 20 upward because of contact with the insulated arm 24. The conductive arm 20 pivoted at the terminal 19 swings in an arc and taps off from the curved resistor 14 at positions increasingly closer electrically to the positive terminal 16 as the gas pressure in the thrust chamber 13 increases. As the pressure increases, a current 39 supplied from the D.C. supply 33 passes through the upper portion of the resistor 18 and divides at the movable contact 21, part of the current 40 flowing through the lead 38 and part of the current 41 flowing through the lower half of the resistor to the negative terminal 17.

The current 40 from the lead 38 flows through the rectifier 36 in the forward direction and charges the capacitor 37, so that the voltage across the charged condenser 37 is nearly the same as the voltage across the lower portion of the resistor 18 of the transducer unit. The rectifier 36 in the forward direction has nearly no voltage drop across it, since it has relatively zero resistance in the forward direction compared to the impedance of the coil 29. There is thus, nearly no voltage across the high impedance coil 29 at this time.

The system operates because of a reduction in voltage across the lower portion of the resistor 18 when the movable contact 21 drops as pressure in the thrust chamber 13 drops. The voltage across the charged condenser 37 always increases and remains substantially equal to the voltage across the lower portion of the resistor 18, as long as the pressure in the thrust chamber increases. Upon a reduction of thrust chamber pressure the decrease in voltage across the lower part of the resistor 18 results in a voltage imbalance and the net electro-motive force of the condenser is the difference between the charged voltage magnitude of the condenser, and the reduced voltage across the lower portion of the resistor 18. The current 40 therefore no longer flows and a reverse current 42 flows from the energy source of the charged condenser 37 through the relay coil 29, which although of a high impedance is much lower than the reverse resistance of the rectifier 36.

A sufficient voltage drop across the lower portion of the resistor 18 will result in a current 42 through the relay coil 29 which will close the relay contacts 26. The relay contacts 26 close only upon reaching a particular magnitude of actuating current through the coil. This relay may be broadly considered as a monostable switching device. Current through the coil 34 closes the solenoid valve 12 shutting off the fuel supply 15 normally in fluid communication, by way of the fuel conduit 14, with the thrust chamber 13 of the rocket motor. The rocket motor thrust chamber 13 is therefore shut off from the fuel supply when the pressure in the thrust chamber decreases a predetermined amount. The predetermined amount is dependent in part upon the chosen resistance of the resistor 18 and the amount of voltage decrease across each increment of its length. The actuating current required by the coil 29 to close the relay contacts 26 determines the time delay of the system, since the magnitude of the actuating current through the coil 29 is not reached instantaneously.

Shutting off the rocket motor fuel supply 15 prevents excess fuel accumulation during sporadic operation of the rocket motor indicated by decreases in pressure in the thrust chamber 13. The rocket motor is therefore prevented from having a destructive explosion due to excess fuel accumulation.

While the closing of the relay contacts 26 was shown to have operated a fuel supply valve 12 in the conduit 14, it will be appreciated that a signal device such as a bell or a light, or the like might be operated instead of such a directly controlled means as a fuel supply valve. The system will monitor any enclosed pressure systems for pressure decreases and it need not necessarily be applied to rocket motors.

In Fig. 2 there is depicted a sketch of graph on which there is shown in the form of solid line, the voltage increment decrease across the transducer potentiometer resistor 18 between the movable contact 21 and the negative terminal 17 during a pressure drop. The graph of the voltage (in volts), is plotted against increment of time (in seconds) required to effect actuation of the relay coil 29. The other solid curve line in Fig. 2 shows condenser current 42 through the relay coil 29 (in ma.) plotted against increment of time (in seconds) required to effect actuation of the relay coil 29. The actuating current magnitude required to actuate the relay coil 29 is shown by a horizontal dotted line in Fig. 2, indicating a fixed current requirement. A dotted voltage plot and a dotted current plot in Fig. 2 indicate the voltage plot and its respective current plot when the voltage change, or pressure change which it represents, starts from a larger magnitude, for example 40 volts in Fig. 2.

Fig. 3 shows a sketch of a graph of pressure (in p.s.i. drop) plotted against time (in seconds) showing a magnified segment of a pressure-time curve in which a pressure drop over a short time period is clearly shown. The sudden decrease in thrust chamber pressure is shown, in the graph of Fig. 3, by the upright V-shaped portion of the graph. The decrease of pressure on this graph is shown as having taken place over a period of 0.025 second (delta $t$) at the completion of which period of time the required actuating current of the relay coil 29 is reached, as shown by the solid current line in Fig. 2. The net pressure decrease in Fig. 3, for example, is a net pressure increment of 0.33 p.s.i. (delta P).

If a voltage decrease across the lower portion of the potentiometer resistor 18 starts from a higher voltage magnitude as shown by the dotted line on the graph of Fig. 2, then the corresponding discharge current 42 through the relay coil 29 will reach the magnitude of the actuating current required by the relay coil in a shorter increment of time. This effect is shown by the intersection of the curved dotted current curve with the dotted horizontal current required line in the graph of Fig. 2. These two plots of current intersect in a time increment of approximately 0.0175 second. It is thus apparent that a higher voltage values for Fig. 2 which are representative of higher thrust chamber pressure, that smaller decreases of resistance between movable contact 21 and the negative terminal 17 are required to actuate the relay coil 29. The value of actuating current required for the relay coil 29 is then reached in a shorter period of time by the condenser discharge current 42 for higher voltage across the condenser 37.

In Fig. 4 there is shown a relay 43 which may be used in place of the relay 11. The relay 43 has an actuating coil 44 which provides an electrical path for the condenser discharge current 42. There is also provided two relay contacts 45 and a sensitivity control coil 46 positioned so as to have mutual flux with the coil 44 when both coils are carrying current. A variable resistor 47 is connected in series with the coil 46 and a D.C. supply 48 is provided across the coil 46 and the portion of the resistor 47 which is electrically in series with it. The relay 43 having the variable resistor 47 and the coil 46, for example, may be used to provide operation at 10 p.s.i. drop at the first step thrust magnitude of a step-start arrangement of a rocket motor, and then set by means of the combination of the D.C. supply 48 and the variable resistor 47 to provide operation at 100 p.s.i. drop at full thrust, or in other words it provides for a device which may be made less sensitive to pressure decreases at greater levels of total pressures in the thrust chamber 13.

Fig. 5 shows a potentiometer resistor 49 which may be used in place of the potentiometer resistor 18. The resistor 49 is a tapered resistor having an end near the negative terminal 17 which has more resistance per unit length than the resistor end near the positive terminal 16. This varying resistance effect is depicted in Fig. 5 by the representation of greater amount of resistor material concentrated near the negative terminal 17 than near the positive terminal 16. By means of this tapered resistor 49, a particular increment of pressure drop at a lower pressure level which will result in the condenser discharge current 42 actuating the relay coil 29, will not for the same increment of pressure drop, result in a condenser discharge current 42 which will actuate the relay coil 29 at a greater pressure level. For example, at a high pressure level a 10 p.s.i. drop produces no actuation, due to only a small coil discharge current 42, whereas at a low pressure level, a 10 p.s.i. drop results in the discharge current 42 reaching the required actuating level. This is because with the resistor of Fig. 5, equal pressure drops at low and high pressure values respectively, produce greater and smaller voltage decreases respectively, between the movable contact 21 and the negative terminal 17. Pressure drops at lower pressure levels cause a movement of the contact 21 toward the negative terminal 17 when the contact 21 is near the region of the negative terminal 17. Pressure drops at the higher pressure levels cause a movement of the contact 21 toward the negative terminal 17 when the contact 21 is near the region of the positive terminal 16.

This system provides an indication of pressure loss which is nearly instantaneous in its action. The time period necessary to operate a relay coil which may be used to eventually shut off the fuel supply by means of the solenoid valve 12 may be a period as short as 1/40 of a second (0.025 sec.), for example. Such a system may be used to monitor the thrust chamber pressure in a rocket motor to bring about rocket motor fuel shut down when there is a sudden pressure drop indicative of a dangerous motor operating condition. Increasing pressure produces no action whereas decreasing pressure, a selected amount at a selected rate, will cause a relay to operate. A sensitivity control as has been described may also be conveniently added so that manually or automatically the rate of pressure drop required to operate the relay may be varied.

In the passing it is noted that a combination of the Fig. 4 variation and the Fig. 5 variation may be used simultaneously on the device of Fig. 1.

Although a preferred embodiment of our invention with two specific variations has been herein disclosed, it is our desire that the invention shall not be limited except in accordance with the appended claims since persons skilled in the art may devise other embodiments still within the limitations of said claims.

We claim:

1. An electrical system which is responsive to pressure changes in a fluid pressure system comprising: means for transducing changes in the pressure in the fluid pressure system to mechanical movement, a potentiometer resistor, terminals at each of the two ends of said resistor, a movable electrical contact disposed on said resistor said contact being mechanically joined to said transducing means for mechanical actuation thereby; a D.C. power supply connected electrically in parallel with said resistor; a rectifier; a condenser connected electrically in series with said rectifier, said series connected rectifier and condenser together being connected electrically in parallel with a portion of said resistor between a resistor end terminal and said movable contact; a coil connected electrically in parallel with said rectifier, said resistor being connected at said end terminals across said D.C. supply in such a manner that said movable contact is more positive than said end terminal connected to said series connected rectifier and condenser, said rectifier being so disposed and arranged as to be electrically between said condenser and said movable contact, said rectifier being so disposed and arranged as to receive current in forward rectifier direction from said movable contact through said rectifier to said condenser said coil having a high impedance in comparison to the forward resistance of said rectifier, said coil having a low impedance in comparison to the reverse resistance of said rectifier; means responsive to current in said coil; whereby a decrease of fluid pressure operates said movable contact in such a manner as to cause a decrease in voltage across the portion of said resistor between the movable contact and the condenser connected end terminal, thereby causing said higher voltage charged condenser to discharge through said coil and operate said means responsive to coil current, said rectifier providing a low resistance path compared to the impedance of the coil for forward conducted current to charge said condenser to the maximum voltage across said resistor portion, and said parallel connected coil thereby providing a low impedance path compared to the reverse resistance of the rectifier.

2. An electrical system which indicates pressure changes in a fluid pressure system comprising: a potentiometer type pressure transducer comprising a potentiometer resistor for said pressure transducer, a movable electrical contact positioned to contact said resistor at various positions dependent on the fluid pressure sensed in said fluid pressure system, means for sensing fluid pressure and transposing said pressure sensed into movement of said movable contact; a D.C. power supply in parallel with said resistor; a rectifier; a condenser connected electrically in series with said rectifier, said rectifier and said series connected condenser being connected electrically in parallel with a portion of said resistor between said movable contact and a resistor terminal; an electrical relay having a coil connected electrically in parallel with said rectifier, the impedance of said coil being high compared to the forward resistance of said rectifier, the impedence of said coil being low compared to the reverse resistance of said rectifier, whereby a charging current from said movable contact of said resistor is passed in a forward direction through said rectifier during one direction of changes of fluid pressure, and whereby a discharging current from said condenser is blocked by reverse resistance of said rectifier and discharges through said coil for said relay during time intervals of fluid pressure changes in the opposite direction, said discharging current from the condenser flowing when voltage is reduced across said resistor portion in parallel with said series connected rectifier and condenser by movement of said movable contact, said current in the relay coil thereby indicating an opposite change in fluid pressure from pressure changes taking place while said condenser is charging.

3. Apparatus according to claim 2 in which said relay comprises said mentioned relay coil, a second relay coil, and a D.C. power supply for said second relay coil, said second relay coil having mutual magnetic flux linkage with said first relay coil, said second relay coil being provided with current of variable magnitude from its D.C. supply, whereby said second relay coil provides for control of magnitude of the actuating current through said first relay coil by means of their mutual flux linkage and the variable current of said second relay coil.

4. Apparatus according to claim 2 in which said potentiometer resistor is varied in resistance over equal increments of its length, whereby an increment of pressure drop at a greater total fluid pressure causes less resistance change in said parallel portion of the potentiometer resistor than an equal increment of pressure drop at a lesser total fluid pressure.

5. Apparatus according to claim 2 in which said fluid pressure system comprises means in fluid communication with a thrust chamber of a rocket motor, and in which said relay has contacts which close when a current of a predetermined magnitude flows through said coil, the circuit of said relay contacts being connected electrically in series with an electrical coil of a solenoid valve for closing the fuel supply conduit of the thrust chamber, thereby shutting off the fuel supply to said thrust chamber.

6. In combination: a resistance element having two terminals which are connected to the positive and negative terminals of a unidirectional current source respectively, an electrical energy storage device connected to said negative terminal of said current source, a unilateral current conducting device connecting said energy storage device and said resistance element at a position intermediate its terminals, and a monostable switching device electrically connected in parallel with said unilateral current conducting device.

7. An electrical system which indicates pressure changes in a fluid pressure system comprising: a resistance having two terminals which are connected to the positive and negative terminals of a unidirectional current source respectively, a movable contact electrically connected with said resistance at any position intermediate said resistance terminals, means for transducing pressure changes in said fluid system to mechanical movement, said contact being mechanically joined to said transducing means for mechanical actuation thereby, an electrical energy storage device connected to said negative terminal of said current source, a unilateral current conducting device connected between said energy storage device and said movable contact, and a monostable switching device electrically connected in parallel with said unilateral current conducting device.

8. An electrical system which indicates pressure changes in a fluid pressure system comprising: a two-terminal resistance connected to a direct current source having positive and negative terminals, a movable contact electrically connected with said resistance at any position intermediate the resistance terminals, means for transducing pressure changes in said fluid system to mechanical movement, said movable contact being mechanically joined to said transducing means for mechanical actuation thereby, a capacitor connected to said one of said resistance terminals connected to said negative terminal of said direct current source, a rectifying device connected between said capacitor and said contact, and a monostable relay capable of actuating a fluid supply valve, said relay being electrically connected in parallel with said rectifier.

References Cited in the file of this patent
UNITED STATES PATENTS

| | | |
|---|---|---|
| 2,199,910 | Cunningham | May 7, 1940 |
| 2,427,750 | Snyder | Sept. 23, 1947 |
| 2,466,846 | Giesler | Apr. 12, 1949 |
| 2,477,507 | Africano | July 26, 1949 |
| 2,583,328 | Dimond | Jan. 22, 1952 |
| 2,635,197 | Routledge et al. | Apr. 14, 1953 |
| 2,641,105 | Drake | June 9, 1953 |
| 2,767,362 | Beaubien | Oct. 16, 1956 |
| 2,902,824 | Sponzilli | Sept. 8, 1959 |
| 2,914,710 | Bell | Nov. 24, 1959 |